United States Patent Office.

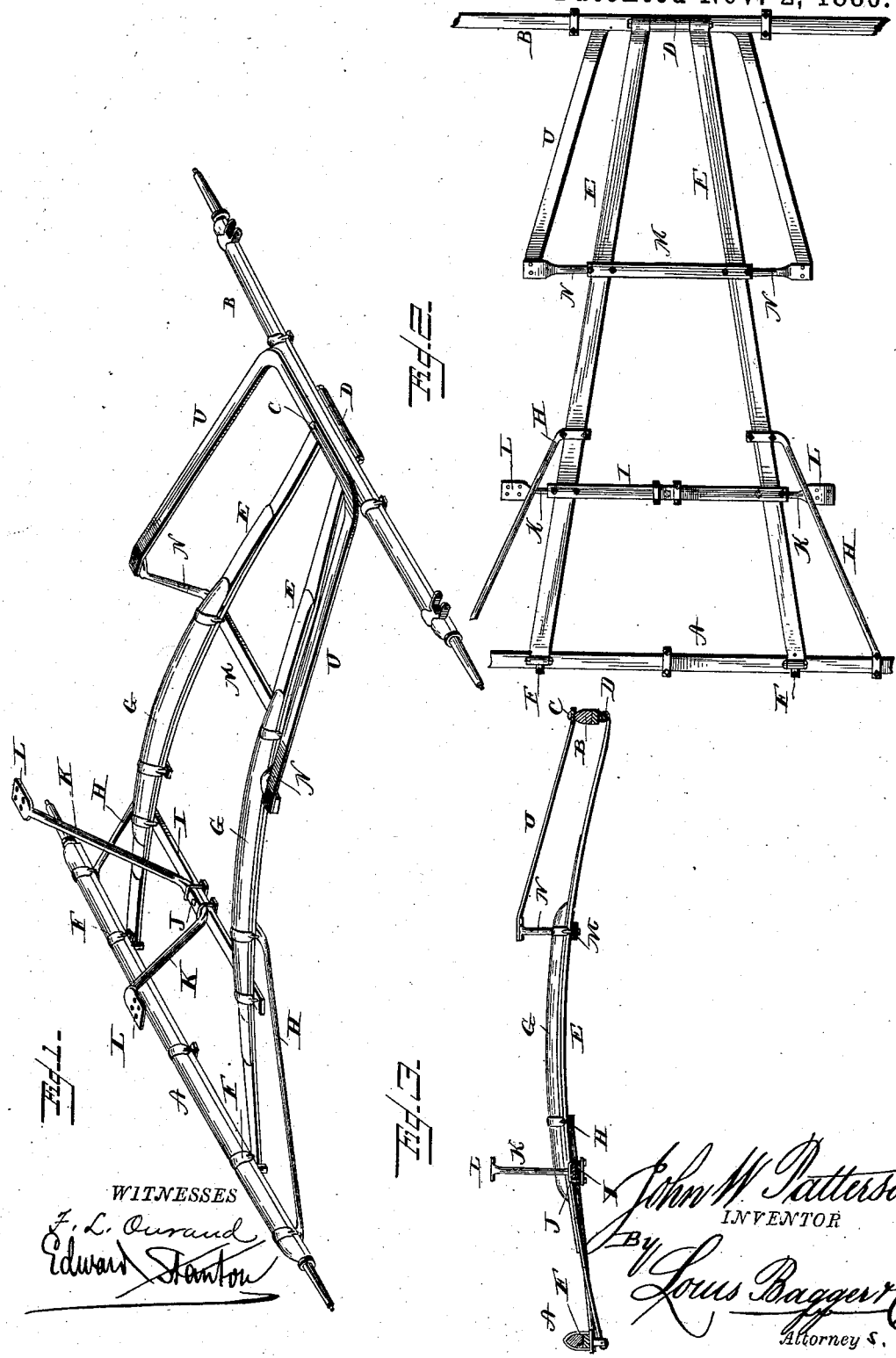

JOHN W. PATTERSON, OF MADISONVILLE, KENTUCKY.

VEHICLE-SPRING.

SPECIFICATION forming part of Letters Patent No. 352,065, dated November 2, 1886.

Application filed July 19, 1886. Serial No. 208,415. (No model.)

*To all whom it may concern:*

Be it known that I, JOHN W. PATTERSON, a citizen of the United States, and a resident of Madisonville, in the county of Hopkins and State of Kentucky, have invented certain new and useful Improvements in Vehicle-Springs; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of as much of the running-gear of a vehicle as will illustrate my improvement. Fig. 2 is a bottom view of the same, and Fig. 3 is a longitudinal vertical sectional view of the same.

Similar letters of reference indicate corresponding parts in all the figures.

My invention has relation to that class of running-gear for vehicles in which two flat springs are secured at their ends to the rear axle and to the king-bolt, having the body supported from them; and it consists in the improved construction and combination of parts of the same, as hereinafter more fully described and claimed.

In the accompanying drawings, the letter A indicates the rear axle, and B is the front axle, through which passes the king-bolt C, which is swiveled at the middle of the axle and provided at its lower end with a cross-head, D. The forward-eyed ends of the flat springs E E are movably secured upon the ends of the cross-head, and the rear ends of these springs are secured by means of clips F F to the rear axle near the spindles of the same.

Two bars, G G, of wood are clipped to the middles of the springs, and two braces, H H, are secured to the inner ends of the spindles of the rear axle and are clipped to the central portions of the springs and to the wooden bars, removing the strain of the rear axle upon the rear ends of the springs to the middles of the same. A cross-bar, I, is clipped at its ends to the springs near their rear ends, and the central portion of a bail, J, having upwardly-diverging legs K K, is clipped to the middle of this bar, the ends of the legs of the bail having flat plates L, which are secured to the bottom of the body of the vehicle. A cross-bar, M, is clipped at the ends of its straight portion to the springs and wooden bars near the forward ends of the springs, and the upwardly-bent ends N N of this bar are flattened and have the rear slightly-bent ends of a U-shaped spring, U, secured to them, the said ends of the spring and of the cross-bar being secured to the forward portion of the vehicle-bottom, the king-bolt passing with its upper end through the middle of the U-shaped spring. This spring will take the strain of the front axle from the cross head upon the king-bolt, and through that upon the forward ends of the springs, and the elasticity of the spring will serve to cushion the vehicle-body at the forward end, the straight springs cushioning the rear portion of the body through the bail and the cross-bar. The U-shaped spring will also serve to prevent the body of the vehicle from coming in contact with the front axle, keeping it raised above the same. It will thus be seen that the body will be supported by the straight springs, and that all strain will be taken off from the springs, with the exception of the strain of the weight of the body, which is cushioned by them, the strain of the draft being borne by the oblique braces at the rear axle and by the U-shaped spring at the forward axle.

All the parts of the running-gear are simple and of a plain and strong construction, so that they are not liable to be broken or otherwise injured by common usage, and all the parts are so simple of construction that any mechanic capable of working in wood and iron may make and repair the gear.

Having thus described my invention, I claim and desire to secure by Letters Patent of the United States—

In a running-gear for vehicles provided with side springs, the combination of a cross-bar secured to the forward portion of said springs, and having upwardly-diverging arms, a U-shaped spring secured to said arms and to the front axle, a cross-bar secured to the rear portions of said springs, and a bail secured to said rear cross-bar having upwardly-diverging legs.

In testimony that I claim the foregoing as my own I have hereunto affixed my signature in presence of two witnesses.

JOHN W. PATTERSON.

Witnesses:
N. R. JONES,
WM. M. RIGGIN.